US012272006B2

(12) United States Patent
Kemeny et al.

(10) Patent No.: US 12,272,006 B2
(45) Date of Patent: Apr. 8, 2025

(54) ROTATIONAL NAVIGATION IN A VIRTUAL ENVIRONMENT WITH A VISUAL REFERENCE

(71) Applicant: DRIVING SIMULATION ASSOCIATION, Antony (FR)

(72) Inventors: Andras Kemeny, Boulogne Billancourt (FR); Florent Colombet, Buc (FR)

(73) Assignee: DRIVING SIMULATION ASSOCIATION, Lorient (FR)

( * ) Notice: Subject to any disclaimer, the term of this patent is extended or adjusted under 35 U.S.C. 154(b) by 0 days.

(21) Appl. No.: 18/550,534

(22) PCT Filed: Mar. 4, 2022

(86) PCT No.: PCT/FR2022/000016
§ 371 (c)(1),
(2) Date: Sep. 14, 2023

(87) PCT Pub. No.: WO2022/195177
PCT Pub. Date: Sep. 22, 2022

(65) Prior Publication Data
US 2024/0169676 A1 May 23, 2024

(30) Foreign Application Priority Data
Mar. 15, 2021 (FR) ...................................... 2102544

(51) Int. Cl.
*G06T 19/00* (2011.01)
*G06F 3/01* (2006.01)

(52) U.S. Cl.
CPC ............ *G06T 19/003* (2013.01); *G06F 3/012* (2013.01)

(58) Field of Classification Search
CPC .............................. G06T 19/003; G06F 3/012
See application file for complete search history.

(56) References Cited

U.S. PATENT DOCUMENTS

| 2016/0282619 | A1* | 9/2016 | Oto | G02B 27/017 |
| 2018/0239425 | A1* | 8/2018 | Jang | G06F 3/015 |
| 2019/0005848 | A1 | 1/2019 | Garcia Kilroy | |

(Continued)

FOREIGN PATENT DOCUMENTS

WO WO-2022117517 A1 * 6/2022

OTHER PUBLICATIONS

Cirio et al., "The Magic Barrier Tape: a Novel Metaphor for Infinite Navigation in Virtual Worlds with a Restricted Walking Workspace", Nov. 18, 2009, VRST '09: Proceedings of the 16th ACM Symposium on Virtual Reality Software and Technology, pp. 155-162 (Year: 2009).*

(Continued)

*Primary Examiner* — Stacy Khoo
(74) *Attorney, Agent, or Firm* — Maier & Maier, PLLC (57) ABSTRACT

A cybersickness reduction system for navigation in an immersive virtual environment, including a control unit with environment data, a position detector from the physical point of view of a user, and a navigation system. The system is able to display and rotationally modify a visual reference according to a command linked to the navigation system and to the rotational movement of the physical point of view of the user relative to the real world.

9 Claims, 5 Drawing Sheets

(56) References Cited

U.S. PATENT DOCUMENTS

2019/0114052 A1  4/2019  McBeth
2019/0220089 A1  7/2019  Kakizawa et al.

OTHER PUBLICATIONS

International Search Report issued on Jul. 25, 2022, in corresponding International Application No. PCT/FR2022/000016, 5 pages.
Feldstein et al. "A Simple Video-Based Technique for Measuring Latency in Virtual Reality or Teleoperation" IEEE Transactions on Visualization and Computer Graphics, IEEE, USA, vol. 27, No. 9, Mar. 13, 2020 (Mar. 13, 2020), pp. 3611-3625, 16 pages.

* cited by examiner

ROTATIONAL NAVIGATION IN A VIRTUAL ENVIRONMENT WITH A VISUAL REFERENCE

FIELD

The present invention relates to a visual frame of reference, for navigation in an immersive virtual environment.

The present invention relates more specifically to a visual frame of reference that is controlled in rotation, capable of reducing or eliminating cybersickness or simulator sickness during movement of a subject immersed in an immersive virtual environment.

BACKGROUND

One of the essential tasks that a user can perform in a virtual environment is movement, also called navigation. As the physical environment in which he or she finds themselves is generally more restricted than the virtual environment, the user must use one or more navigation methods.

Navigation is subject to the phenomenon known as cybersickness or simulator sickness, which manifests as symptoms of nausea, headaches, or dizziness, sometimes even vomiting. This movement can take place for example by using joysticks in an immersive room, called a CAVE, or by being equipped with a head-mounted display, or by being in a driving or flight simulator. Whether the navigation is carried out in a CAVE, in a simulator, or by being equipped with a Virtual Reality (VR) or Augmented Reality (AR) headset, and whether the goal is training, research, industrial design, or gaming, the phenomenon of cybersickness is encountered by a large number of users, making testing difficult, unrepresentative, or sometimes interrupting the exercise.

In the event that the display system used to view the virtual environment occupies a small visual field in a real environment, for example in the case of AR, the field of view of the player or user is sufficiently small that he is not completely immersed, maintaining his external visual cues. Said user is therefore less subject to said nausea.

Conversely, a user navigating in an immersive virtual environment, such as in a CAVE or with a virtual or augmented reality headset, is frequently subject to cybersickness, or simulator sickness in the case of a simulator. One of the main reasons is that the movement perceived visually during virtual displacement conflicts with the movement perceived by the vestibular system. The movement most likely to cause simulator sickness is rotation (for example when executing a turn—yaw and/or roll, but also during braking—pitch). Indeed, the brain of a user accustomed to moving in the real world expects to receive measurements of acceleration and speed coming from the vestibular system of the user's inner ear, more precisely from the semicircular canals, that are consistent with those estimated by the visual system. In the absence of these physical effects being reproduced by an appropriate system, such as a dynamic driving or flight simulator, the brain triggers symptoms resembling those of motion sickness. In the real world, visual and vestibular information are consistent during motion. In contrast, in an immersive virtual environment, in particular in a CAVE or when equipped with a head-mounted display, changes in the visual environment during navigation are dissociated from the physical movement of the user and can therefore generate simulator sickness.

Simulator sickness is well known in the field of virtual environments. To reduce simulator sickness, it is known to reassociate visual perception with a physical movement.

There are two main categories of means for moving about within a virtual environment:
motion compensation devices:
These allow the user to move naturally without having to trigger commands. The Cyberwalk omnidirectional treadmill or the Cybersphere are examples, and there are many other systems (mat of hemispherical balls, network of moving tiles, cybershoes, robot arms attached to the feet, etc.). Most of these devices have the disadvantage of being large or intrusive, and not very suitable for general public use. In addition, most are only suitable for natural movements of the observer, without being able to call upon navigation systems, for example a vehicle or any simulated artificial system.
navigation methods:
These are often already existing control laws for devices (joysticks, virtual reality gloves, etc.) which modify the movement process employed in real life, making them rapid to learn and easy to use. Several of these exist, for example walking in place, which consists of mimicking walking in order to move forward. Redirected walking in place is one solution to the immersion problems caused by the missing sides in the CAVE: it rotates the environment imperceptibly so that the user never has to face towards the missing side. The virtual companion is a virtual animal guided by reins; it tows the user and allows rotations.

For example, "Grabbing the Air" is a navigation process in which the user can grab the air with his hand, bring it back towards himself to scroll through the environment, and make a lateral movement to cause it to rotate around him. A disadvantage of this system is that it does not reduce simulator sickness because the user's brain does not receive information from his vestibular system that is consistent with the information estimated by the visual system.

Publication US-A1 2004/0102676 discloses a coupling system between the visual environment and navigation, in order to reduce motion sickness. Said system requires several hardware devices such as a gyroscope, accelerometers, a positioning system known as a GPS or "Global Positioning System", optical sensors and vibration sensors, and multiple software, in order to reduce said motion sickness.

A disadvantage of that disclosed system is the need to use numerous hardware devices, which results in high costs as well as requiring sophisticated control of all the devices.

Patent publication no. FR3025645-1458421 makes it possible to break down a rotational movement into two movements, each of them natural, and thus avoids generating motion sickness or cybersickness by proposing first performing a movement both visual and physical in the virtual world and then a movement of the operator that is also both visual and physical. However, since this process is not natural, it cannot be used to perform rotations in a manner that is natural and comprehensible for the operator.

Aside from the previously cited patent, the use of a navigation method generates a movement that is only reproduced visually, and therefore generates a visual-vestibular conflict potentially causing simulator sickness. For example, for a rotation to the right, a navigation method will generally use a rotation of the virtual environment to the left to reproduce it.

SUMMARY

One aim of the invention is to remedy the effects of cybersickness by supplementing or modifying a method of rotational navigation in an immersive virtual environment.

The object of the invention relates to reducing cybersickness for any virtual movement of the observer controlled by a navigation system which generates cybersickness effects since it generates a visual-vestibular conflict. Said movement can be broken down into a linear movement, and a rotational movement concerned by the invention.

The object of the invention is to reduce cybersickness and simulator sickness for rotational movement, regardless of the axis of said rotation.

The object of the invention is therefore to provide a means of performing a rotational movement in an immersive virtual environment in an efficient, comfortable manner and without visual-vestibular discomfort (cybersickness or simulator sickness).

The object of the invention concerns the display and rotation of a visual reference which makes it possible to generate an involuntary rotation of the user's head, according to the commonly accepted assumption of a stationary surrounding world. During navigation in a virtual environment, this movement of the user's head, and possibly body, induced by the invention makes it possible to reduce or even eliminate the visual-vestibular conflict and thus to reduce or even eliminate simulator sickness or cybersickness.

Throughout the rest of this document,

The real world (or physical world) is the frame of reference for the room in which the user is physically located.

The physical point of view of the user comprises the spatial coordinates of a point representative of the user's view in the physical world; this point may be for example a mid-point between the user's eyes.

The virtual environment (or virtual world) of the user comprises all the virtual elements that can be viewed by the user.

The virtual point of view of the user comprises the spatial coordinates of a point representative of the user's view in the virtual world.

The virtual visual environment of the user is the portion of the virtual environment displayed on the display system, corresponding to the virtual point of view of the user.

The visual reference is an element such as a wireframe representation of a CAVE-type room, an arrow on the floor, or any other type of visual artifact or reference, which can be displayed overlaying the virtual visual environment.

The navigation method (or navigation system) is the means used by the user to trigger modifying his virtual point of view in the virtual environment, whether by means of a physical device, a voice command, or some action or movement of all or part of his body.

The object of the invention is characterized more particularly by a method supplementing a navigation method, used by a user in an immersive virtual environment comprising a control unit comprising environment data, and capture means from the physical point of view, integrating a potential body movement of said user, characterized in that said method is able to display and rotationally modify a visual reference according to a command linked to the navigation method and to the rotational movement of the physical point of view, and to cause said movement of the physical point of view by rotation of the visual reference.

Advantageously, the visual reference is rotationally modified according to a command linked to the navigation method and to the rotational movement of the user's head, therefore the user's brain perceives information from his vestibular system that is consistent with the information estimated by the visual system, which significantly reduces or even eliminates the risk of simulator sickness depending on the system's response time.

Advantageously, at the start of the user's navigation in the virtual environment by means of the navigation method, the visual reference is preferably oriented to be aligned with the user's physical point of view. Said visual reference possibly may not be displayed when the navigation method is not used.

Advantageously, the visual reference is displayed when the user uses the navigation method.

Advantageously, during rotational navigation, the visual reference rotates in the desired direction so that the physical point of view also rotates in the same direction.

At the same time, the virtual world rotates in the opposite direction relative to the real world, reduced by some or all of the rotational movement from the observer's physical point of view, due to the impact of the rotation of the visual reference.

The rotation speeds relative to the real world of the visual reference and of the virtual world are advantageously controlled according to perception thresholds, the elapsed time, as well as the rotation speed of the physical point of view relative to the real world.

The rotation perceived by the user is that of his head relative to the virtual world, i.e. the combination of the rotation of the virtual world relative to the real world and the rotation of his head relative to the real world.

When the user stops using the navigation method, the visual reference stops moving and possibly may no longer be displayed. The virtual world also stops moving relative to the real world. The rotation performed during navigation is the combination of the rotation of the virtual world relative to the real world and the rotation of the head relative to the real world.

Advantageously, the cybersickness reduction method comprises:
 a step of displaying a visual reference 10,
 a step of rotating the visual reference 10, linked to the navigation system 9 and to the orientation of the physical point of view 4 of the user 1 relative to the real world 11.
 a step of deactivating the display of the visual reference 10.

According to the principle of the invention, the display system can be stationary relative to the real world, as in most CAVE or immersive room types of installations, or attached to the user's head, as in the case of a virtual or augmented reality headset.

BRIEF DESCRIPTION OF FIGURES

Other features and advantages of the invention will become apparent upon reading the following detailed description, for which one can refer to the following accompanying drawings for better understanding.

DETAILED DESCRIPTION

In the following description, identical reference numerals designate parts that are identical or have similar functions.

Figure 1:
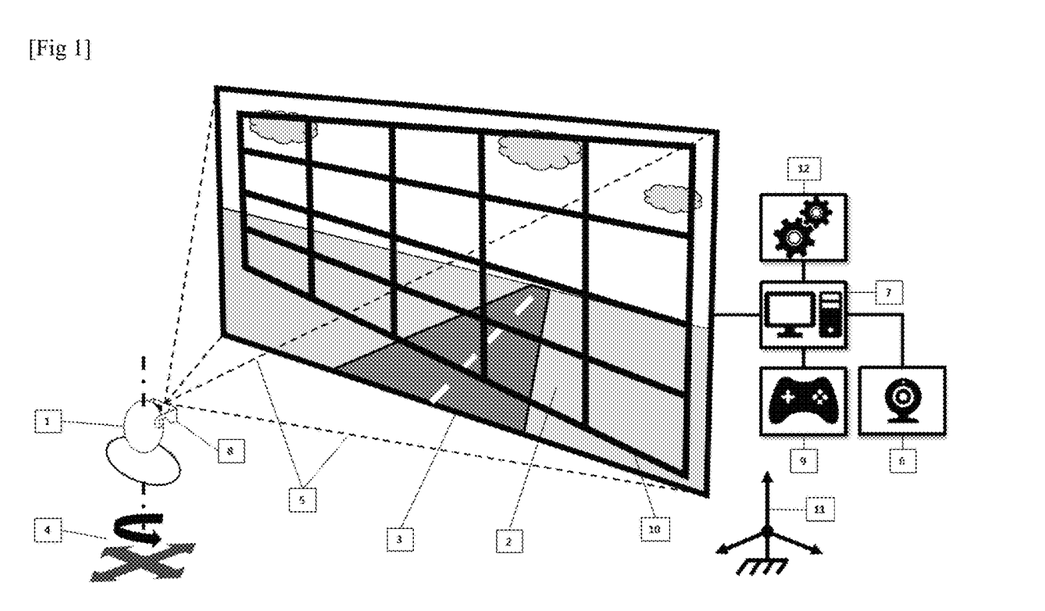
FIG. 1 is a schematic view of an immersive room with a user navigating in a virtual environment.

According to FIG. 1, which shows one embodiment of the invention, a user 1 can navigate virtually in a virtual environment 2 displayed on a display system 3. Display system 3 can comprise for example a screen for a "Powerwall" type system, two screens for a "Workbench" type system, from three to six screens for a "CAVE" type system, or more generally one or more screens of any form(s) for an immersive room. Display system 3 can also be a virtual or augmented reality headset.

The representation of virtual environment 2 depends on physical point of view 4 of user 1 relative to real world 11, pyramid of vision 5 according to which he views said representation, as well as the position of the user's virtual point of view. Physical point of view 4 of user 1 is continuously measured by a position sensing system 6, such as cameras for example.

The images displayed on display system 3 are generated by a control unit 7 connected to said display system as well as to position sensing system 6.

User 1 may or may not be provided with a specific pair of glasses 8 to provide him with a stereoscopic perception of the virtual environment 2 on display system 3, or of any other dimensional display system.

A navigation method 9 enables user 1 to move around in virtual environment 2. This system may be activated by an external speaker (not shown), or by user 1 via movements of all or part of his body and/or physical interfaces such as a controller, a joystick, a treadmill, a steering wheel, or pedals for example.

Finally, a cybersickness or simulator sickness reduction system 12 controls the display and the rotational movement of a visual reference 10, displayed superimposed on virtual environment 2. Visual reference 10 can take the form for example of a vertical grid as in FIG. 1, an arrow on the ground, or any other shape, artifact, or object.

Figure 2:
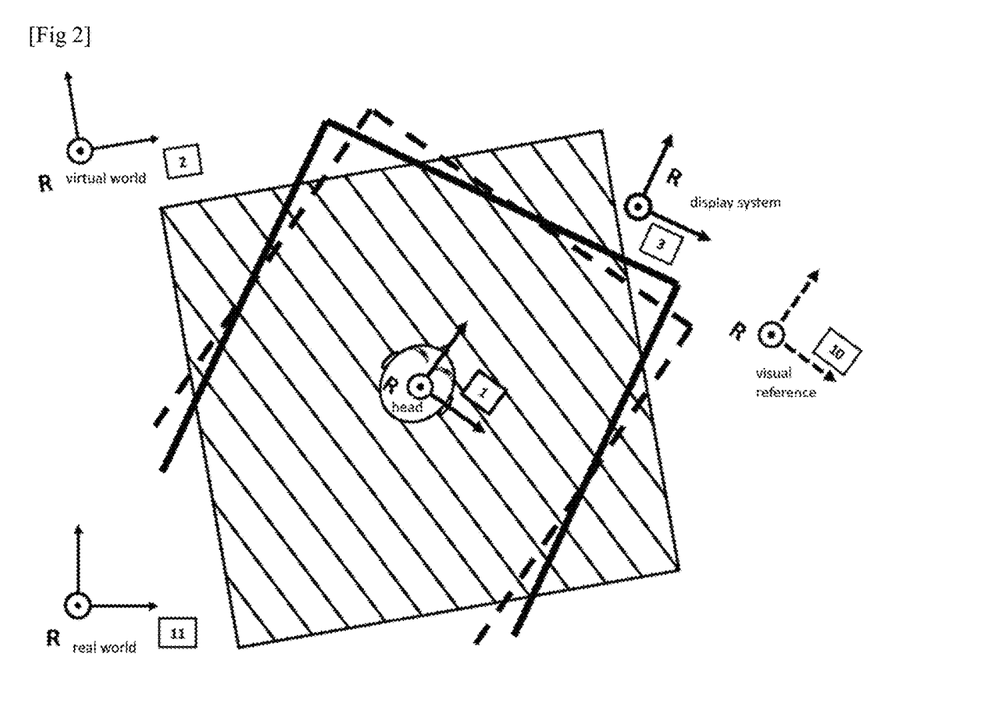
FIG. 2 is a schematic top view illustrating the use of the invention with a CAVE type of environment.

FIG. 2 illustrates a top view of a use of the invention with a CAVE type of system. Virtual world 2 is represented by the hatched area. Display system 3 of the CAVE is symbolized by the three bold lines, and visual reference 10 is symbolized by the three dotted lines.

Figure 3:
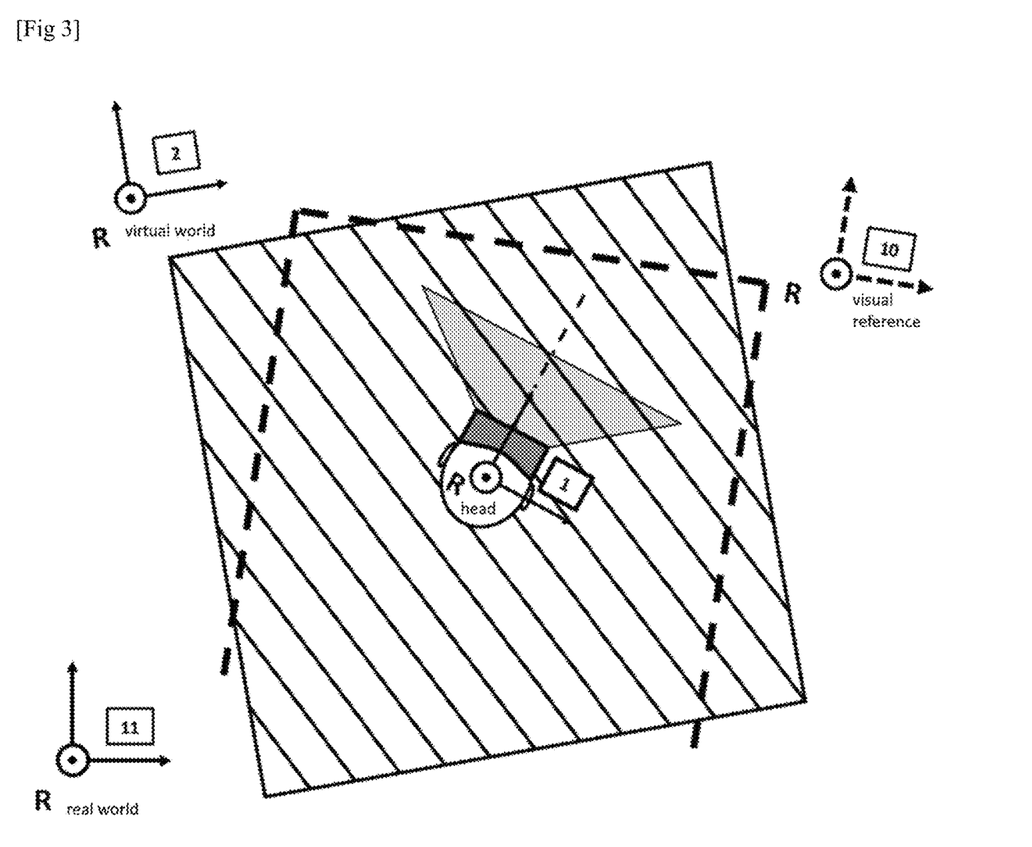
FIG. 3 is a schematic top view illustrating the use of the invention with a virtual or augmented reality headset.

FIG. 3 illustrates a top view of a use of the invention with a virtual or augmented reality headset.

As in FIG. 2, virtual world 2 is represented by the hatched area, and visual reference 10 is represented by dotted lines.

In FIGS. 2 and 3, several frames of references can be used to describe and understand the operation of the invention.

"R real world" is the frame of reference of real world 11, meaning the frame of reference of the physical room in which the user is located.

"R virtual world" is the frame of reference of virtual environment 2 displayed by display system 3.

"R head" is the frame of reference for the physical point of view of user 1.

"R visual reference" is the frame of reference linked to visual reference 10, the invention relating in particular to this frame of reference.

Finally, "R display system" is the frame of reference for display system 3 on which the representation of the virtual environment is displayed.

In most CAVE or immersive room types of installations, display system 3 is stationary relative to real world 11. In this case, "R display system" and "R real world" are fixed relative to each other. When using a virtual or augmented reality headset, display system 3 is attached to the head of user 1, and therefore in this case it is "R display system" and "R head" which are stationary relative to each other. For clarity, "R display system" is therefore not represented in FIG. 3, as it is more or less indistinguishable from "R head".

Figure 4A:
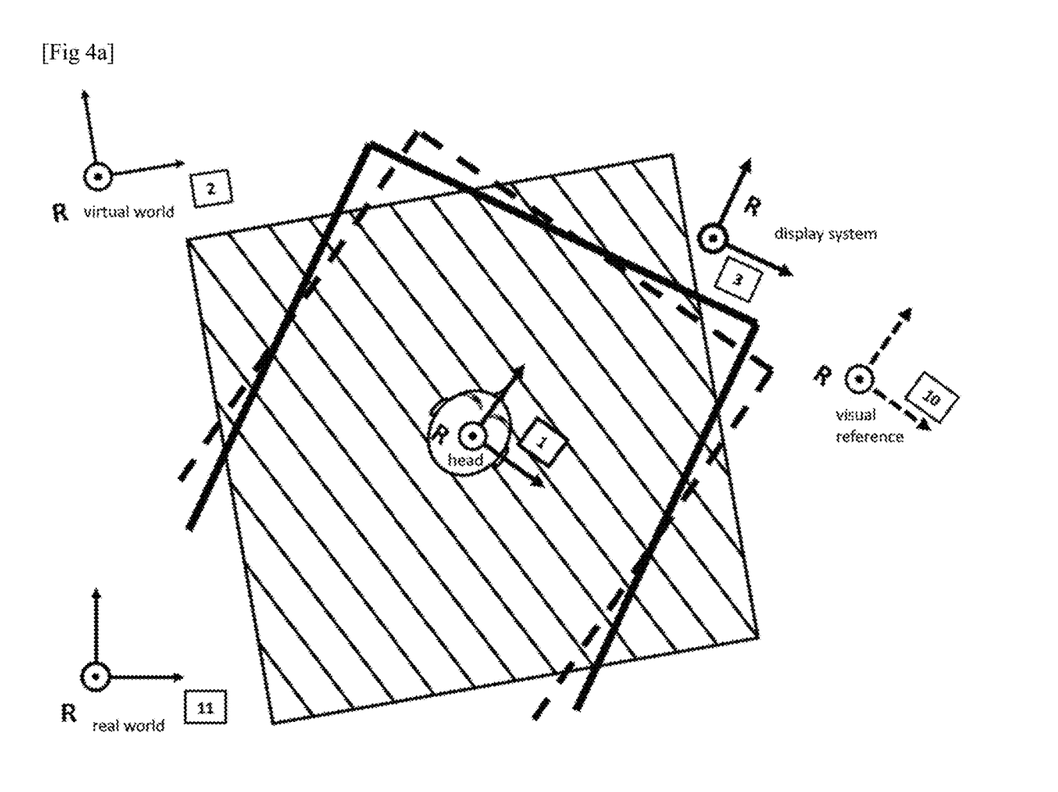
FIG. 4a is a schematic view of rotational modification of the virtual environment.
Figure 4B:
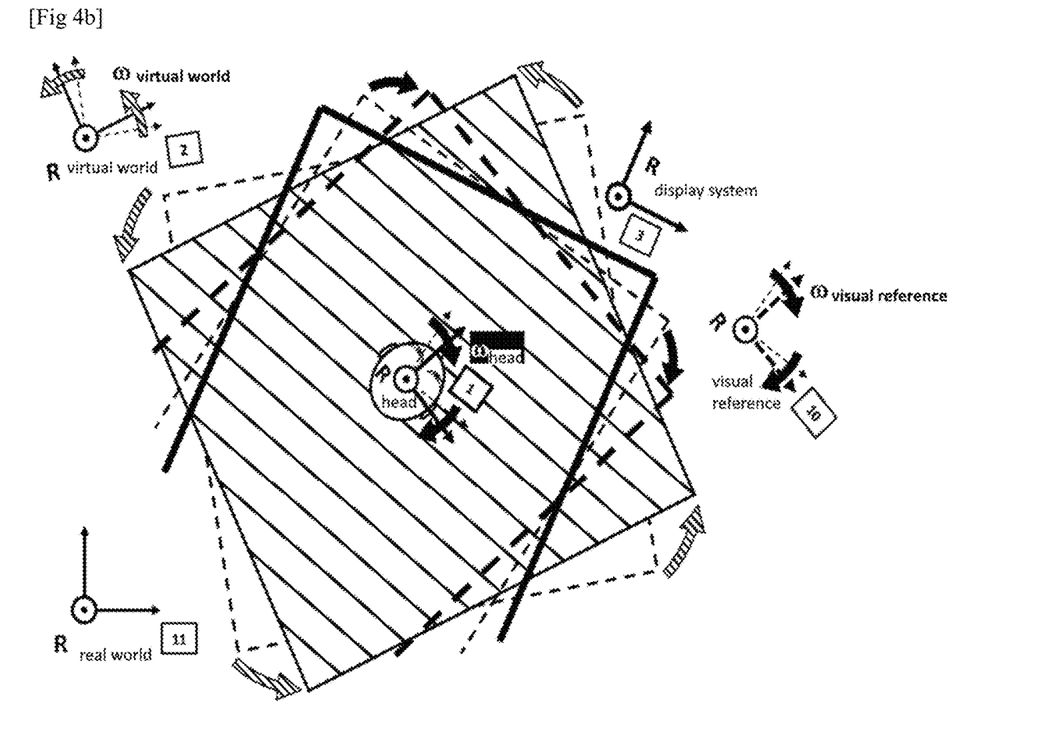
FIG. 4b is a schematic view of rotational modification the visual reference.
Figure 4C:
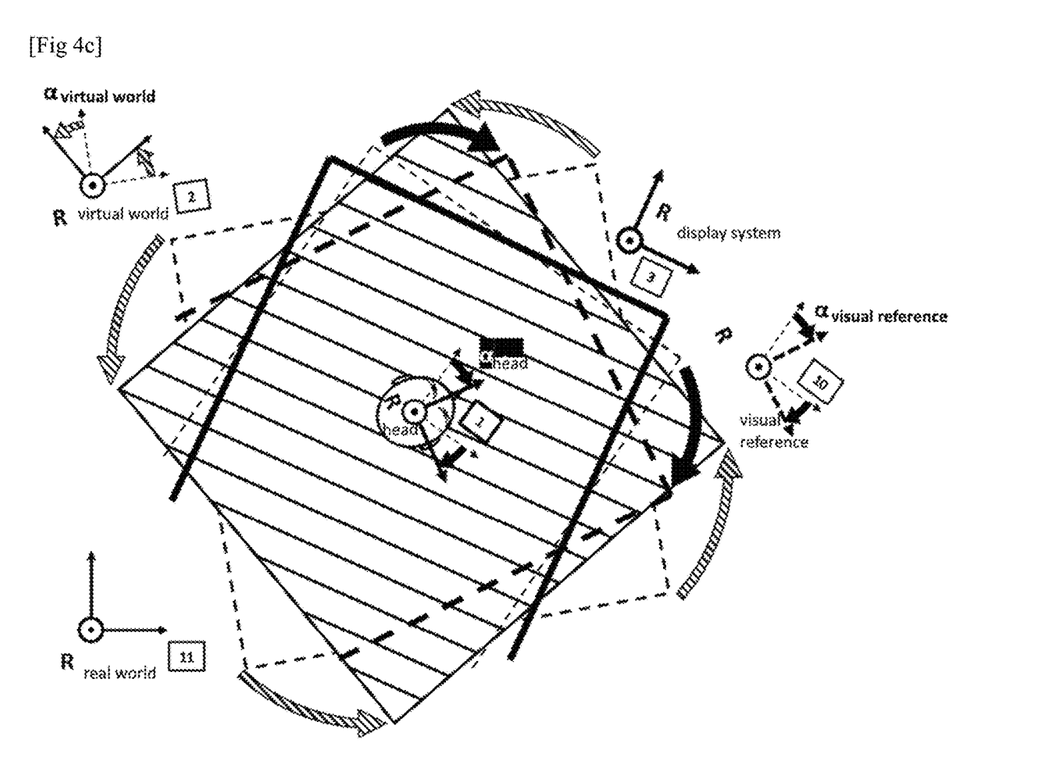
FIG. 4c is a schematic view of rotational modification of the user's head.

FIGS. 4a, 4b, and 4c show an example of rotation to the right in a CAVE-type environment with invention 12. The example rotation shown in FIGS. 4a, 4b, and 4c is a yaw rotation around a vertical axis passing through the head of user 1.

FIG. 4a shows the initial state before rotation by means of navigation method 9 and of invention 12. According to FIG. 4a, the head of user 1 and visual reference 10 are aligned, i.e. "R head" and "R visual reference" are aligned. In this initial state, visual reference 10 may possibly not be displayed.

FIG. 4b illustrates the case of a rotation to the right by means of navigation method 9 and of invention 12.

Visual reference 10 rotates at speed "ω visual reference" in the desired direction (to the right in this example) so that said head also rotates at speed "ω head" to the right.

At the same time, virtual world 2 rotates in the opposite direction (to the left in this example) relative to real world 11, reduced by some or all of the rotational movement of the head of observer 1 due to the impact of the rotation of visual reference 10.

The rotation speeds of visual reference 10—"ω visual reference"—and of virtual world 2—"ω virtual world"—relative to real world 11 are advantageously controlled according to perception thresholds, the elapsed time, as well as the rotation speed of the head of user 1 relative to real world 11—"ω head".

The rotation perceived by user 1 is that of his head relative to virtual world 2, i.e. the combination of the rotation of virtual world 2 relative to real world 11 and the rotation of his head relative to real world 11.

In most CAVE or immersive room types of installations, display system 3 is stationary relative to real world 11. This is the case in this illustration, where the frame of reference of display system 3 remains constant relative to that of real world 11.

FIG. 4c represents the final state after the example of a yaw rotation by means of navigation method 9 and of invention 12.

Visual reference 10 has rotated through an angle "a visual reference" relative to the initial state in FIG. 4a.

User 1 has turned his head so as to keep it aligned with visual reference 10. The head of user 1 has therefore rotated through an angle "a head" that is equal to "a visual reference".

At the same time, virtual world 2 has rotated through an angle "a virtual world" in the opposite direction.

As the rotation perceived by user 1 is that of his head relative to virtual world 2, he has therefore perceived a rotation corresponding to the sum of the rotation of his head relative to real world 11 and the rotation of virtual world 2 relative to real world 11. The perceived rotation is therefore the sum of "a head" and "a virtual world".

The head of user 1 has pivoted during the rotational navigation in virtual environment 2 and the brain therefore perceives information from his vestibular system that is consistent with that estimated by the visual system, the aim being to alleviate or even eliminate simulator sickness.

The objective of the invention has been achieved: navigation method 9 and the cybersickness reduction method 12 according to the invention make it possible to reduce or even eliminate simulator sickness during rotational navigation in virtual environment 2, this type of movement being the most likely to produce simulator sickness.

However, the invention is not reduced to the embodiment presented above, and those skilled in the art will know how to provide any variant that is in accordance with its spirit. For example, the axis of rotation in the navigation may not be vertical for pitch or roll rotations.

The invention claimed is:

1. A cybersickness reduction system for navigation in an immersive virtual environment, comprising a control unit, a virtual environment displayed on a display system, a position sensing system from a physical point of view of a user, and a navigation system for moving a virtual point of view of the user within the virtual environment, wherein the cybersickness reduction system is configured to:
    display a visual reference positioned relative to the physical point of view of the user;
    monitor rotations of the virtual point of view of the user relative to the virtual environment, that are generated by the navigation system;
    monitor rotations of the physical point of view of the user relative to the real world; and
    rotationally modify said visual reference relative to the physical point of view of the user according to a command which allows reducing a difference between the rotations of the virtual point of view and the rotations of the physical point of view of the user wherein the visual reference is displayed only during periods of rotational navigation and is deactivated when the rotational navigation ceases to prompt the user to naturally align their head movements.

2. The cybersickness reduction system according to claim 1, wherein the visual reference is generated virtually and displayed with the virtual environment by the display system.

3. The cybersickness reduction system according to claim 1, wherein the visual reference is a distinct graphical element separate from the virtual environment.

4. The cybersickness reduction system according to claim 1, wherein the command to rotationally modify the visual reference is configured to prompt a rotation of the head of the user to reduce the difference between the monitored rotations of the virtual point of view and the monitored rotations of the physical point of view.

5. The cybersickness reduction system according to claim 1, wherein the visual reference is dynamically adjusted in real-time based on the monitored rotations of the user's head to encourage natural head movements that align the physical and virtual rotations, thereby reducing cybersickness.

6. A cybersickness reduction method of a cybersickness reduction system for navigation in an immersive virtual environment, the cybersickness reduction system comprising a control unit, a virtual environment displayed on a display system, a position sensing system from a physical point of view of a user, and a navigation system for moving a virtual point of view of the user within the virtual environment, the cybersickness reduction method comprising:
    displaying a visual reference;
    rotating the visual reference relative to the physical point of view of the user according to a command which allows reducing a difference between monitored rotations of the virtual point of view and monitored rotations of the physical point of view of the user; and
    deactivating the display of the visual reference, wherein the visual reference is displayed only during periods of rotational navigation and is deactivated when the rotational navigation ceases to prompt the user to naturally align their head movements.

7. The cybersickness reduction method according to claim 6, wherein the visual reference is a distinct graphical element separate from the virtual environment.

8. The cybersickness reduction method according to claim 6, wherein the command to rotationally modify the visual reference is configured to prompt a rotation of the head of the user to reduce the difference between the monitored rotations of the virtual point of view and the monitored rotations of the physical point of view.

9. The cybersickness reduction method according to claim 6, wherein the visual reference is dynamically adjusted in real-time based on the monitored rotations of the user's head to encourage natural head movements that align the physical and virtual rotations, thereby reducing cybersickness.

* * * * *